(12) United States Patent
Skemer

(10) Patent No.: US 6,567,406 B1
(45) Date of Patent: May 20, 2003

(54) METHOD OF LABELING DATA UNITS WITH A DOMAIN FIELD

(75) Inventor: Terry Skemer, Ottawa (CA)

(73) Assignee: Tropic Networks Inc., Kanata (CA)

( * ) Notice: Subject to any disclaimer, the term of this patent is extended or adjusted under 35 U.S.C. 154(b) by 0 days.

(21) Appl. No.: 09/464,452

(22) Filed: Dec. 10, 1999

(51) Int. Cl.[7] .......................... H04L 12/56; G06F 13/00
(52) U.S. Cl. .................... 370/392; 370/395.1; 370/465; 370/471; 709/236; 709/238
(58) Field of Search .............................. 370/230, 230.1, 370/252, 253, 351, 352, 389, 395.1, 395.2, 395.21, 395.4, 395.41, 412, 428, 429, 468, 470, 471, 477, 236, 390, 392, 465, 466, 467; 709/232, 234, 235, 238, 236, 246

(56) References Cited

U.S. PATENT DOCUMENTS

| | | | |
|---|---|---|---|
| 4,651,318 A | | 3/1987 | Luderer |
| 5,546,387 A | | 8/1996 | Larsson et al. |
| 5,583,859 A | * | 12/1996 | Feldmeier .................... 370/471 |
| 5,805,820 A | * | 9/1998 | Bellovin et al. ........ 395/200.55 |
| 6,295,296 B1 | * | 9/2001 | Tappan ....................... 370/392 |
| 6,466,985 B1 | * | 10/2002 | Goyal et al. ................ 709/238 |

* cited by examiner

Primary Examiner—Alpus H. Hsu
(74) Attorney, Agent, or Firm—Victoria Donnelly; Anne Kinsman

(57) ABSTRACT

A method and device are provided for an improved system and method of labeling data units with a domain field that is fast, scalable and simple to implement in domain switching applications without adding to the protocol overhead. The system and method are also suitable for point-to-multipoint configurations.

21 Claims, 4 Drawing Sheets

METHOD OF LABELING DATA UNITS WITH A DOMAIN FIELD

FIELD OF THE INVENTION

This invention generally relates to the labeling of IP data units, and is particularly concerned with providing a domain field label for use in domain switching applications.

BACKGROUND OF THE INVENTION

Domain switching is a label method of switching data packets, such as Internet Protocol Version 4 (IPv4) packets based on Domain Numbers. Domain switching is designed to allow simple, fast route lookups and quick forwarding, minimizing intra-switch latency and increasing throughput. When Domain switching was created, a method of 'marking' user packets (or data units) was needed to convey Domain and Priority values. Marking is the application of system information to IP packets. The method of marking used in Domain switching applications had to be fast, scalable, and simple to implement for it to be useful. In Domain switching, marking packets is essential to track the networks that the packets are supposed to be on and the preference afforded to the packet. A simple method of doing this is to insert the required data into the middle of packets, typically in the region where the data itself resides, in the form of a secondary header. This method, though simple in concept, increases the processing overhead and reduces the bandwidth available for data transmission.

Domain switching is used in both datagram transport, where packets are sent sequentially and can follow any path between the source and destination nodes, and virtual circuit communications where all packets follow a designated path between source and destination nodes to ensure in order delivery of data. In reference to datagram transport methods it is common to use the terms datagram and packet interchangeably.

In the past, additional protocol headers or trailers have been needed to carry this important internal information. An additional header means that only devices that support the header protocol can interact with the header. Implementation of the link layer 2 of the standard Open System Interconnection (OSI) architectural model is complicated by the presence of an 'unknown' header immediately following the OSI link layer (e.g., ATM, Frame Relay, PPP, Ethernet, etc.) and LLC/Type headers. The header protocol could be made public and turned into an industrial standard, but there is no guarantee that a particular vendor will implement it. This was the challenge to pioneers of IP switching, TAG switching, Multi-Protocol Label switching (MPLS), etc.

Additional headers also add to the total amount of protocol overhead, which in turn consumes valuable access network bandwidth. They also add an extra layer of abstraction to the OSI architectural model, limiting implementation choices and increasing forwarding inefficiencies. At both the endpoints and forwarding points, additional headers require specialized protocol handlers to interpret the header contents.

The IP protocol was created in the late 1960s and incorporated the conventional wisdom of that era. The current IP Version 4 standard, Request For Comments (RFC) 791, was ratified in 1981, and until recently, the construct of the header and the purpose of the fields were considered sacred and untouchable. The Differentiated Services (Diff-Serv) Architecture changed all that. The Type-of-Service (ToS) field, after more than a decade of spotty implementation and relative neglect, has recently been changed to the Diff-Serv field and is designed to request Quality-of-Service (QoS) levels within IP networks.

In some ways there are technologies in the art today that can serve to remedy some of the problems posed by marking packets for Domain switching. The primary candidate is MPLS, the related IP switching or TAG switching. MPLS is one of the industry's favoured approaches, because it allows the IP packets to be 'switched' at a higher rate than routing. It was designed for the high throughput requirements of the network core or backbone because routing is having difficulty keeping up to the growing demands. The MPLS industry is coming along, but the standards and products are neither mature nor stable. MPLS is an evolution of IP switching, TAG switching, Flow switching in IPv6, and Label swapping. Each of these methods affixes a small header called a label onto the IP datagram and forwarding is based on the label rather than on the destination UP address. Labels are retained while the packet is inside the MPLS network and removed as it leaves. Labels can be swapped at each hop similar to the way ATM headers are removed and added by each ATM switch in the path.

Nevertheless, MPLS was not designed to work in a point-to-multipoint configuration as is required for many Domain switching situations. Each head-end of a domain network could have a single head end with the possibility of an excess of 1000 front ends (i.e. users). Each front end would need its own MPLS label or session. This is not the intended purpose of MPLS.

U.S. Pat. No. 5,546,387 attempts to provide a solution to efficient packet labeling in the form of a hardware switch that allows efficient use of the memory space available for storing a label list at ingress and egress points.

This method does not provide protection to labeled packets if they are inadvertently delivered to the wrong network, as they can still be read by the various nodes in the foreign network. In addition, it requires that the ingress and egress switching nodes utilize a look up table based on the packet labels so that routing can be simplified. This may not be practical at congested switches, as the memory requirements would balloon with increases in the size of the foreign network, or networks, which would render conventional switches incapable of storing a full list.

U.S. Pat. No. 4,651,318 enables packet labeling through the use of stage identifier fields, which are embedded in the data field of a packet. Though effective, this approach does not efficiently use resources as it will result in the introduction of more data packets so that the data can be transmitted.

There is therefore a need for an improved labeling method to meet the requirements of Domain switching without suffering from the problems outlined above.

For reading convenience, the following is a glossary of abbreviations used throughout the specification.

| | |
|---|---|
| ATM | Asynchronous Transfer Mode |
| DSLAM | Digital Subscriber Line Access Multiplexor |
| ELP | Embedded Labeling Protocol |
| FDI | Flow Direction Indicator |
| IP | Internet Protocol |
| IPSec | Secure Internet Protocol |
| IPv4 | Internet Protocol version 4 |
| IPv6 | Internet Protocol version 6 |
| ISO | International Standards Organization |
| ISP | Internet Service Provider |
| LLC | Logical Link Control |

-continued

| | |
|---|---|
| MPLS | Multi-Protocol Label Switching |
| OSI | Open Systems Interconnection |
| QoS | Quality of Service |
| SAR | Segmentation and Reassembly |
| TCP | Transmission Control Protocol |
| ToS | Type of Service |
| TTL | Time To Live |
| UDP | User Datagram Protocol |
| VAN | Virtual Access Network |

SUMMARY OF THE INVENTION

It is an object of this invention to provide an improved system and method of labeling data units with a domain field that is relatively fast, scalable, and simple to implement for domain switching applications. It is another object of this invention to provide a labeling method which will not add to the total amount of protocol overhead. It is yet another object of this invention to provide a system and method of labeling which is suitable for point-to-multipoint configurations.

In accordance with the first object of the invention there is provided an Embedded Label Protocol (ELP) method of labeling a data unit having a header comprising the steps of generating a domain information sequence having a preselected domain length, for use in forwarding the data unit within an access network; identifying at least one first field in the header, that is assigned to carry a first information sequence useable only outside the access network, and which has a length equal to at least the domain length; and overwriting the domain information sequence into the at least one first field, upon ingress of the data unit into the access network. An aspect of the current object of the invention is an ELP method, as described above, where the domain information sequence contains a domain number that may be at least 12 bits long. Another aspect of the current object of the invention is an ELP method, as described above wherein one of the domain information sequences contains a domain number, which may be at least 12-bits long. Another aspect of the current object of the invention is an ELP method where in one of the domain number, as described above, defines a service provider domain, and the remaining values of the domain number define customer domains. Yet another aspect of the current invention is an ELP method wherein the domain information sequence, as described above, further contains a flow direction indicator. A further aspect of the current invention is an ELP method wherein the flow direction indicator, as described earlier, is at least 1-bit long to provide a distinction between downstream and upstream flows within the access network, and where optionally the domain number is used in upstream forwarding of the data unit. Another aspect of the current invention is an ELP method, as described earlier, wherein the domain information sequence further contains a priority indicator, which optionally identifies one of at least four quality of service levels, and which optionally is 4-bit long. Another aspect of the current object of the invention is an ELP method, as described earlier, further comprising the step of restoring the first information sequence into the at least one first field, upon egress of the data unit from the access network. Another aspect of the current invention is an ELP method as described earlier, wherein the at least one first field is designated by Internet Protocol as a header checksum field. Another aspect of the current invention is an ELP method as described earlier, further comprising the steps of identifying a second field in the header, that is assigned to carry a second information sequence useable only outside the access network; and overwriting the second field with a marker for distinguishing the data unit as being labeled, and optionally further comprising the step of restoring the second information sequence into the second first field, upon egress of the data unit from the access network. Another aspect of the current invention is an ELP method as described above wherein the second field is designated by Internet Protocol as a version filed, which optionally has a value of 4, and the marker has a value of zero.

A second object of the current invention is a switching system for forwarding data units to and from the access network by using the ELP method defined in any one of the aspects of the object described above.

A third object of the current invention is a switching system, comprising at least one first component for linking an IP data network to the access network, and at least one second component for linking the access network to a group of user devices interconnected by a local network, wherein each of the at least one first and second components uses the ELP method defined in the first object of the invention. An aspect of this object of the invention is a switching system as described earlier, wherein the at least one first component includes a first IP interface for connection to the IP data network and at least one first ELP interface for connection to the access network. Another aspect of this object of the invention is a switching system as above, wherein the at least one first component is a plurality of first components, and the at least one first ELP interface includes a plurality for linking together said plurality of first components. A further aspect of the current invention is a switching system as described above, wherein the second component includes a second ELP interface for connection to the access network and a second IP interface for connection to the local network.

This invention provides an Embedded Labeling Protocol (ELP) for an access network where traffic from a large number (e.g. 1000's) of customers flow from a primary head end (for example, an ISP or corporate Headquarters) to multiple front-ends. It provides the simple fast lookups needed to achieve high throughputs while retaining a simplicity that makes the engineering and maintenance of the system easier to perform.

Embedded Labeling Protocol (ELP) is a method of labeling IP Packets while they are within an ELP access network using different fields in the standard IP Header in an unconventional manner so as to provide additional features without substantially increasing either computational demands or the size of a packet. ELP adds no protocol overhead and both the packet labeling process on ingress and the packet restoration process at egress are computationally simple.

BRIEF DESCRIPTION OF THE DRAWINGS

Exemplary embodiments of the invention will now be further described with references to the drawings in which same reference numerals designate similar parts throughout the figures thereof, and wherein.

DESCRIPTION OF THE PREFERRED EMBODIMENT

Figure 1:
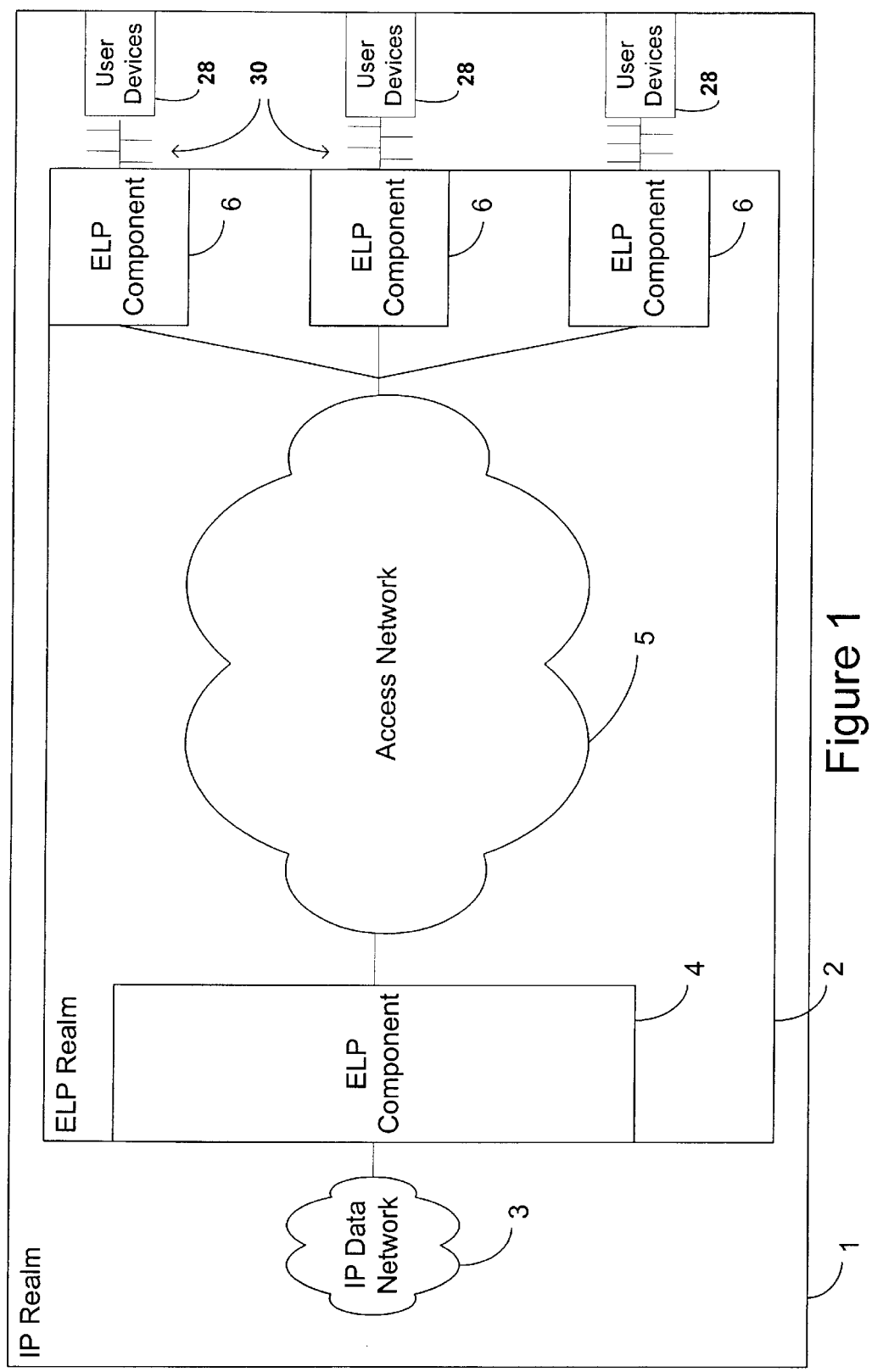
FIG. 1 illustrates, in a block diagram, an Embedded Label Protocol (ELP) embodiment of the present invention used within an IP network environment.

This invention makes use of at least one field in the IP header for inserting a Domain information sequence, where such field no longer has a valid purpose in today's IP network environment. For example, the IP Header Checksum is no longer needed at least in private access networks, where a majority of devices only interacts with the OSI physical and link layers 1 and 2. In such access networks, most devices do not function past either OSI layer 1 or 2. There, the IP Header Checksum field is only used in OSI network layer 3 devices. The IP Header Checksum field used to be relevant when IP was originally created, but is currently considered to be an outdated field by both the International Standards Organization (ISO) and the Internet Engineering Task Force (IETF). In its OSI model, ISO recommends that error checking should only be performed at either the link layer 2 or the transport layer 4. Layer 2 error checking is used by protocols such as Frame Relay, Ethernet, and ATM SAR to detect errors when transmitting data across physical links. Layer 4 checksums provide end-to-end (i.e. user-to-user) integrity assurance and is used in protocols such as UDP and TCP. IETF considers that the IP Header Checksum, originally created for old noisy lines, has since outlived its usefulness. As a consequence, IETF no longer has a Header Checksum field in IPv6 and instead, has mandated Layer 4 UDP and TCP checksums in IPv6. In other words, the evolution of IP standards does not include a Header Checksum field. Many of the authors of recent networking textbooks also concur with the above positions taken by ISO and IETF.

Nonetheless, the Header Checksum field is still used in some IP routers as part of a router's extensive datagram handling procedure that includes decrementing the TTL field, performing a forwarding lookup, datagram fragmenting if necessary and finally recalculating the Header Checksum. Such routers do check the IP Header Checksum and will discard packets that do not match. Therefore, in this invention, the Header Checksum field is utilised only within the realm of an access network outside the realm of the IP world. At the point that the packet joins the IP world, the IP Header Checksum must be reset to its original value through the 16-bit 1 s-complement checksum algorithm defined in RFC 1624 to ensure interoperability with ISP, corporate, or Internet routers as well as destination user devices.

Furthermore, an embodiment of this invention also makes use of established deterministic fields in the IP Version 4 standard that are not needed while the packet is outside the IP world.

FIG. 1 illustrates an Embedded Label Protocol (ELP) embodiment of this invention used within a network environment that is divided into two realms, the IP realm 1, and the ELP realm 2 within which this embodiment is designed to operate. The IP realm 1 contains at least one IP data network 3, which can be an Internet server or a private LAN operated by a private enterprise or an Internet Service Provider (ISP).

The ELP realm 2 is comprised of a first ELP component 4, which connects to the IP data network 3 of the IP realm 1. This first ELP component 4, is connected to at least one second ELP component 6 through an Access Network 5, which is one of a variety of 'last-mile' access technologies including xDSL and T1. Each of the second ELP components 6 is connected to at least one group of user devices 28. For data access, the user devices 28 include data terminals linked via an IP data network 30 such as a WAN or any one of a number of LAN configurations including a single PC per port, multiple PC's on a 10BaseT hub LAN or switch, or multiple LAN's connected to a third-party router. For voice-band access, the user devices 28 include telephony and other voice-band devices (e.g., modems, FAX, etc.) linked via Private Branch Exchanges (PBX).

The first and second ELP Components 4 and 6, overwrite the headers of incoming packets with ELP information at the ingress and restores the original header information into outgoing packets at the egress before handing off the outgoing packet to the IP realm. The ELP information includes Domain Number, Priority Indicator, Flow Direction Indicator (FDI) and ELP Marker. The Domain Number, Priority Indicator and FDI collectively form part of a Domain information sequence.

In this embodiment, the IP Packet Header portions designated as the 4-bit Version field and the 16-bit IP Header Checksum field are used to carry the ELP Marker and the Domain information sequence, respectively. To do this, the IP Header Checksum field is renamed as the Domain field, and the IP Version field is renamed as the ELP Marker field, while the packet is within the ELP realm.

Figure 2:
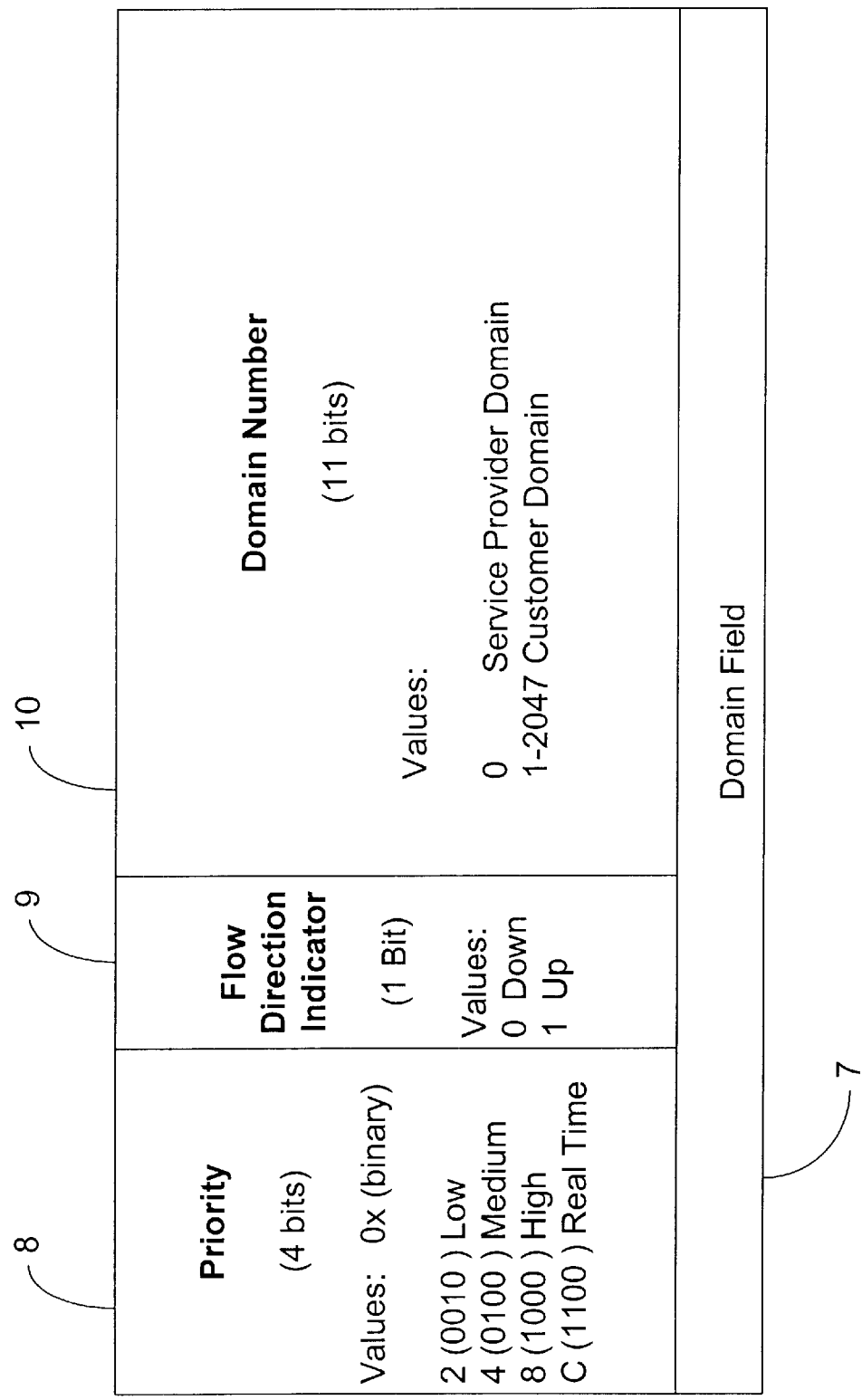
FIG. 2 illustrates the composition of the Domain field in accordance with an embodiment of this invention.

FIG. 2 illustrates the composition of the Domain field 7 created to carry the Domain information sequence. Here, the Domain field 7 includes a 4-bit Priority Indicator sub-field 8, a 1-bit Flow Direction Indicator (FDI) sub-field 9, and an 11-bit Domain Number sub-field 10, in the given order. The Priority sub-field 8, specifies what degree of precedence should be granted to the packet. Sixteen priority values are possible with higher values given precedence over lower values. Priorities are mapped to either bandwidths or classes of service. Certain priority values are designated labels due to their frequent use. A binary value of 0010 (hexadecimal 2) is considered low priority. A binary value of 0100 (hexadecimal 4) is considered medium priority. A binary value of 1000 (hexadecimal 8) is considered high priority. A binary value of 1100 (hexadecimal C) is considered to be real time priority.

The single FDI bit 9, identifies the flow as being 'upstream' towards the high-end or 'downstream' towards the front-ends. The FDI 9 is used in trunking applications to determine whether an upstream or downstream Forward table should be consulted. The FDI 9 also ensures that packets are not caught in a forwarding loop. There are two possible values for the FDI 9. The first value is 0, which indicates that the flow of the packet is downstream. The second value is 1, which indicates that the flow of the packet is upstream.

The Domain Number 10 is in effect equivalent to the Virtual Access Network (VAN) identifier. With 11 bits in the Domain Number, it is possible to support up to 2048 Domains with ELP. A Domain Number of 0 value is reserved to indicate the Service Provider Domain. The values 1–2047 denote various Customer Domains. With 4 Priority bits, each Domain is capable of containing 16 individual classes of service.

Figure 3:
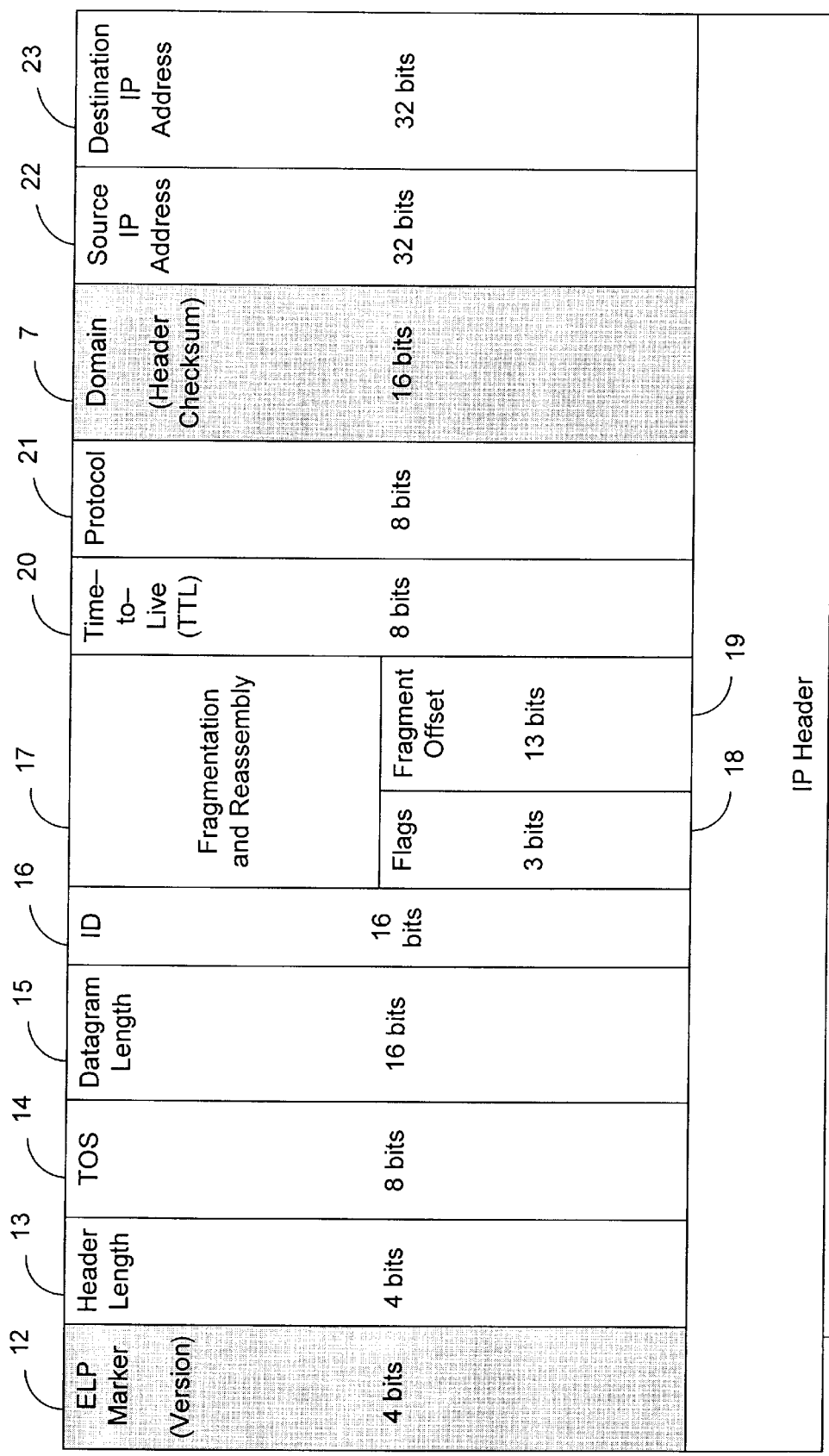
FIG. 3 illustrates the placement of the Domain field shown in FIG. 2, and the ELP Marker field into the header of an IP packet.

FIG. 3 illustrates the placement of the aforementioned Domain field 7, and the aforementioned ELP Marker field 12, into the header of an IP packet 11. Beginning from the front of the IP header 11, shown leftmost in FIG. 3, is the 4-bit long ELP Marker field 12, which occupies the same space designated as the Version field in the IP realm. This is followed in order by the 4-bit long Header Length field 13, the 8-bit long TOS (DS) field 14, the 16-bit long datagram length field 15, and the 16-bits long ID field 16. Following these fields is the 16-bit long Fragment and Reassembly Information field 17, the 3-bit long Fragment Flag field 18, the 13-bit long Fragment Offset field 19, the 8-bit long Time to Live (TTL) field 20, the 8-bit long Protocol Identifier field 21. These are followed by the aforementioned Domain field 7, which occupies the same space designated as the Header Checksum field in the IP realm. This is then followed by the 32-bit long Source IP Address field 22, and the 32-bit long Destination IP Address field 23.

The Domain field 7 and the ELP Marker field 12 are overwritten with the ELP information and the ELP Marker, respectively, at the ingress to the ELP realm and restored to their IP Header Checksum value and the Version value, respectively, at the egress of the ELP realm. The ELP Marker field 12, is set to a value of '0' (zero) at ingress into the ELP system, and is subsequently restored to a value of '4' (four) at egress before handoff from the ELP realm 2 to the IP realm 1. Setting the ELP Marker field 12 to '0' unambiguously identifies this packet as being marked by ELP. IP packets arriving on the first or second ELP interface 4 or 6, bearing a value of '4' in the ELP Marker field 12 are treated as being unmarked and as having been accidentally introduced into the access network. These unmarked packets will be logged and discarded when detected.

Figure 4:
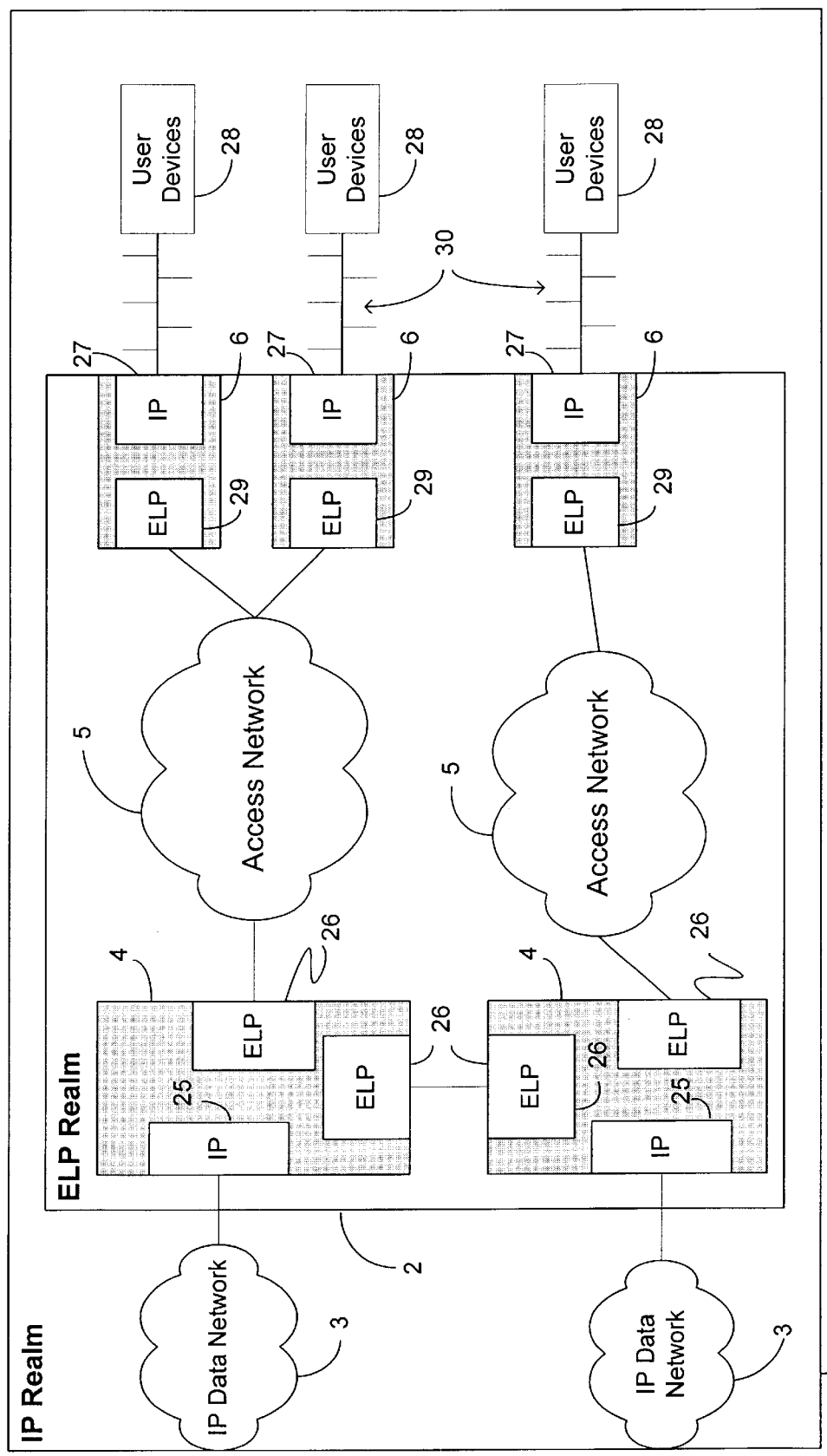
FIG. 4 illustrates the positioning of the ELP interfaces and the IP interfaces in the embodiment shown in FIG. 1.

FIG. 4 illustrates the positioning of the ELP and IP interfaces in the system. There are three types of interfaces that are applicable to ELP: ingress IP, egress IP, and internal ELP interfaces. As shown in FIG. 4, each IP Data Network 3 in the IP realm 1 connects to a first Ingress/Egress IP Interface 25. The first IP Interface 25 is a subcomponent of the first ELP Component 4, as is the first Internal ELP interface 26. The first Internal ELP interface 26, connects to a second Internal ELP interfaces 29 of the second ELP Component 6, either directly or through an Access Network 5. On the other side of the Access Network 5, packets are routed into the second Internal ELP Interface 29 of the second ELP component 6. The corresponding second Ingress/Egress IP Interface 27 of the second ELP component 6, routes the information to various User Devices 28 via local networks 30 for data access and via PBXs for voiceband access, as already explained above with reference to FIG. 1.

The procedure at each of the interfaces mentioned above is described as follows with reference to FIG. 3:

(A) At each ingress IP interface:

1. Receive an IP packet from the IP realm 1;
2. Re-designate the 4-bit Version field as the ELP Marker field 12 and overwrite it with a value of 0x0 (zero);
3. Re-designate the 16-bit IP Header Checksum field as the Domain field 7 and overwrite it with the user's ELP information; and
4. Forward the resulting ELP packet.

(B) At each egress IP interface:

1. Receive the ELP packet internally;
2. Restore the 4-bit ELP Marker field 12 as the Version field and overwrite it with its original value of 0x4 (four);
3. Calculate 1 s-complement checksum for the packet IP header 11;
4. Restore the 16-bit Domain field 7 as the IP Header Checksum field and overwrite it with the checksum calculation result; and
5. Transmit the resulting IP packet out of the egress interface according to the corresponding priority setting.

(C) At each internal ELP interface:

1. Receive a packet from a link;
2. If the 4-bit ELP Marker field 12 is set to any value other than 0x0 (zero), log and discard the packet; and
3. Read the 16-bit ELP value from the Domain field 7 and forward.

As mentioned earlier, if the ELP Marker field 12 of an incoming packet still contains a value of 4 when a packet enters the ELP realm 2, it is logged and then discarded. Similarly, in the event that a packet leaves the ELP realm 2 and the egress interface has not reset the ELP Marker field 12 to the original Version field value of 4, the elements of the IP Data Network will not understand a Version field of a 0 value, and will thus discard the packet. Additionally, if the Domain field 12 is not reset to the proper Checksum Header of the original Checksum Header field, then an OSI Layer 3 device will not properly understand the contents of the packet as it will detect a Checksum error and will discard the packet. As a result of these methods of operation, it is clear that the ELP of this invention can introduce the desired features to the Access Network 5 while protecting the contents of the packets from being examined on an external IP network that they were not intended to be transmitted on.

In the application of ELP Subscriber Management, features are performed at the front end due to a consideration that the access network is a resource that must be protected in a similar manner to that of the ISP interface. To minimize the possibility of denial-of-service attacks and to reduce protocol overhead in the access network, all user packets are authenticated at the front-end. To do this, a security system at the front end interfaces with an external security server to authenticate users, upload statistics, and to receive responses containing dynamic provisioning information such as IP address assignments. Once authenticated packets are free to be switched upstream to the destination ISP. If not authorized the packet is discarded.

This invention makes use of the IP Header Checksum field for carrying the domain information while the data unit is within the access network. Although putting the domain information into this field will not adversely affect Layer 1 or 2 devices, there is a need to ensure that no Layer 3 devices are encountered in the access network. It is possible to encounter one of two types of IP devices in the access network, as follows:

A. IP-aware special-purpose devices, such as a QoS-supporting DSLAM, that will only look at pertinent bits, most likely in the Diff-Serv field, while ignoring ELP's use of the Header Checksum.

B. Real and virtual IP routers that will provide complete router functionality (i.e. TTL decrement, fragmentation, routing protocols, Header Checksum calculation, etc.).

In the relatively unlikely event that an IP router/network is situated in the access network, the devices implementing ELP packets, in accordance with this invention, will be carried in a single IP tunnel to provide a transparent point-to-point path across the access network. All packets flowing between the ELP devices are prefixed with a second, outer IP header and flow transparently across an IP router-based access network as with the conventional IPSec technique.

The exemplary embodiments described above are provided for the sake of clarification and are not intended to limit the scope of the invention. Of course, numerous variations and adaptations may be made to the above-described embodiments of the invention, without departing from the spirit of the invention, which is defined in the claims.

What is claimed is:

1. An Embedded Labelling Protocol (ELP) method of labelling a data unit having a header comprising the steps of:
   a) generating a domain information sequence having a pre-selected domain length, for use in forwarding the data unit within an access network;
   b) identifying at least one first field in the header, that is assigned to carry a first information sequence useable only outside the access network, and which has a length equal to at least the domain length; and
   c) overwriting the domain information sequence into the at least one first field, upon ingress of the data unit into the access network.

2. An ELP method as in claim 1, wherein the domain information sequence contains a domain number.

3. An ELP method as in claim 2, wherein the domain number is at least 12-bit long.

4. An ELP method as in claim 2, wherein one value of the domain number defines a service provider domain, and the remaining values of the domain number define customer domains.

5. An ELP method as in claim 2, wherein the domain information sequence further contains a flow direction indicator.

6. An ELP method as in claim 5, wherein the flow direction indicator is at least 1-bit long to provide a distinction between downstream and upstream flows within the access network.

7. An ELP method as in claim 6, wherein the domain number is used in upstream forwarding of the data unit.

8. An ELP method as in claim 2, wherein the domain information sequence further contains a priority indicator.

9. An ELP method as in claim 8, wherein the priority indicator identifies one of at least four quality of service levels.

10. An ELP method as in claim 8, wherein the priority indicator is 4-bit long.

11. An ELP method as in claim 1, further comprising the step of restoring the first information sequence, into the at least one first field, upon egress of the data unit from the access network.

12. An ELP method as in claim 1, wherein the at least one first field is designated by Internet Protocol as a header checksum field.

13. An ELP method as in claim 1, further comprising the steps of:
   d) identifying a second field in the header, that is assigned to carry a second information sequence useable only outside the access network; and
   e) overwriting the second field with a marker for distinguishing the data unit as being labeled.

14. An ELP method as in claim 13, further comprising the step of restoring the second information sequence into the second first field, upon egress of the data unit from the access network.

15. An ELP method as in claim 13, wherein the second field is designated by Internet Protocol as a version field.

16. An ELP method as in claim 15, wherein the second information sequence has a value of 4, and the marker has a value of zero.

17. A switching system for forwarding data units to and from an access network, comprising:
   means for performing an Embedded Labelling Protocol (ELP) method of labeling a data unit having a header;
   the means comprising:
      (a) means for generating a domain information sequence having a pre-selected domain length, for use in forwarding the data unit within an access network;
      (b) means for identifying at least one first field in the header, that is assigned to carry a first information sequence useable only outside the access network, and which has a length equal to at least the domain length; and
      (c) means for overwriting the domain information sequence into the at least one first field, upon ingress of the data unit into the access network.

18. A switching system, comprising at least one first component for linking an IP data network to an access network, and at least one second component for linking the access network to a group of user devices interconnected by a local network, wherein each of the at least one first and second components comprises means for performing an Embedded Labelling Protocol (ELP) method of labeling a data unit having a header, the means comprising:
   (a) means for generating a domain information sequence having a pre-selected domain length, for use in forwarding the data unit within an access network;
   (b) means for identifying at least one first field in the header, that is assigned to carry a first information sequence useable only outside the access network, and which has a length equal to at least the domain length; and
   (c) means for overwriting the domain information sequence into the at least one first field, upon ingress of the data unit into the access network.

19. A switching system as in claim 18, wherein the at least one first component includes a first IP interface for connection to the IP data network and at least one first ELP interface for connection to the access network.

20. A switching system as in claim 19, wherein the at least one first component is a plurality of first components, and the at least one first ELP interface includes a plurality for linking together said plurality of first components.

21. A switching system as in claim 18, wherein the second component includes a second ELP interface for connection to the access network and a second IP interface for connection to the local network.

* * * * *